United States Patent
Huang et al.

(10) Patent No.: US 9,141,241 B2
(45) Date of Patent: Sep. 22, 2015

(54) TOUCH SENSING STRUCTURE

(71) Applicant: ELAN MICROELECTRONICS CORPORATION, Hsinchu (TW)

(72) Inventors: Chia-Jui Huang, Kinmen County (TW); Che-Hao Hsu, New Taipei (TW)

(73) Assignee: ELAN MICROELECTRONICS CORPORATION, Hsinchu (TW)

( * ) Notice: Subject to any disclaimer, the term of this patent is extended or adjusted under 35 U.S.C. 154(b) by 53 days.

(21) Appl. No.: 13/903,187

(22) Filed: May 28, 2013

(65) Prior Publication Data
US 2014/0204050 A1    Jul. 24, 2014

(30) Foreign Application Priority Data
Jan. 18, 2013 (TW) .............................. 102102037 A

(51) Int. Cl.
*G06F 3/044* (2006.01)
*G06F 3/041* (2006.01)
*G06F 3/0354* (2013.01)
*G06F 3/046* (2006.01)
*G06F 3/047* (2006.01)

(52) U.S. Cl.
CPC ............ *G06F 3/044* (2013.01); *G06F 3/03547* (2013.01); *G06F 3/041* (2013.01); *G06F 3/0414* (2013.01); *G06F 3/046* (2013.01); *G06F 3/047* (2013.01); *G06F 2203/04111* (2013.01); *G06F 2203/04112* (2013.01)

(58) Field of Classification Search
USPC ................................ 345/173, 174; 178/18.06
See application file for complete search history.

(56) References Cited

U.S. PATENT DOCUMENTS

| | | | |
|---|---|---|---|
| 4,550,221 A | 10/1985 | Mabusth | |
| 6,699,395 B1 * | 3/2004 | Svenkeson et al. | 216/13 |
| 7,129,935 B2 | 10/2006 | Mackey | |
| 7,202,859 B1 | 4/2007 | Speck et al. | |
| 8,199,127 B2 | 6/2012 | Mamba et al. | |
| 8,608,896 B2 * | 12/2013 | Horstkemper et al. | 156/295 |
| 9,007,192 B2 * | 4/2015 | Tenuta | 340/407.2 |
| 2004/0262036 A1 * | 12/2004 | Brist et al. | 174/261 |
| 2006/0124972 A1 * | 6/2006 | Booth et al. | 257/222 |
| 2010/0059294 A1 * | 3/2010 | Elias et al. | 178/18.06 |
| 2010/0079401 A1 * | 4/2010 | Staton | 345/174 |

(Continued)

FOREIGN PATENT DOCUMENTS

| | | |
|---|---|---|
| CN | 102073431 A | 5/2011 |
| TW | M425341 U1 | 3/2012 |
| TW | M428420 U1 | 5/2012 |

*Primary Examiner* — Srilakshmi K Kumar
*Assistant Examiner* — Deeprose Subedi
(74) *Attorney, Agent, or Firm* — Li & Cai Intellectual Property (USA) Office

(57) ABSTRACT

A touch sensing structure is provided. The touch sensing structure includes a substrate, a plurality of first conductive traces and a second conductive trace. The plurality of first conductive traces is formed on the substrate. Each of the first conductive trace includes a trunk and at least one branch. The trunks of the first conductive traces are disposed to be parallel with each other. The branch of each first conductive trace is extended from one side of the trunk toward the adjacent first conductive trace. The branches between the two adjacent first conductive traces are disposed to be opposite and alternative. A path is composed of the two adjacent trunks and the branches disposed to be opposite and alternative. The second conductive trace is formed on the substrate, disposed between the two adjacent first conductive traces and extended along the path.

17 Claims, 8 Drawing Sheets

(56) References Cited

U.S. PATENT DOCUMENTS

| | | | |
|---|---|---|---|
| 2013/0093699 A1* | 4/2013 | Lee et al. | 345/173 |
| 2013/0127752 A1* | 5/2013 | Takeuchi et al. | 345/173 |
| 2013/0207924 A1* | 8/2013 | Mohindra et al. | 345/174 |
| 2014/0022202 A1* | 1/2014 | Badaye et al. | 345/174 |
| 2014/0049505 A1* | 2/2014 | Radivojevic et al. | 345/174 |
| 2014/0098046 A1* | 4/2014 | Tenuta | 345/173 |

* cited by examiner

TOUCH SENSING STRUCTURE

BACKGROUND

1. Technical Field

The present disclosure relates to a capacitive touch panel, in particular, to a touch sensing structure of the capacitive touch panel.

2. Description of Related Art

Conventionally, the operating and input interface of an electronic device includes a keyboard or a mouse in keying type. However, operating electronic device by touching screen becomes the current trend. Particularly, touching screen may simplify the operating interface and provide user with more user-friendly input methods like gestures.

Referring to FIG. 1A, FIG. 1A is a schematic view illustrating a conventional capacitive touch sensing structure. Touch electrode units are usually disposed in matrix-type such as first axial electrodes 91 (Y-axis) and second axial electrodes 92 (X-axis) as illustrated in FIG. 1A. The first axial electrodes 91 and the second axial electrodes 92 comprise a plurality of electrode units. Conventionally, the form or the pattern of the electrode units is the diamond type as illustrated in FIG. 1A. Each electrode unit corresponds to a coordinate in the matrix. The capacitive touch sensing structure is usually covered by an insulating layer, e.g. glass, to form a capacitive touch panel. When user's finger or other conductors approach the capacitive touch panel, the capacitance of the electrode units will be changed so that the detecting circuit connected to the electrode units can detect the changes of the capacitance of the electrode units to generate touch screen signals. The form or the pattern of the electrode units may affect the magnitude of the changes of the sensing capacitance or the sensitivity of the touch screen.

SUMMARY

An exemplary embodiment of the present disclosure provides a touch sensing structure which can be implemented in a touch panel.

An exemplary embodiment of the present disclosure provides a touch sensing structure. The touch sensing structure comprises a substrate, a plurality of first conductive traces and a second conductive trace. The plurality of first conductive traces is formed on the substrate. Each of the first conductive trace includes a trunk and at least one branch. The trunks of the first conductive traces are disposed to be parallel with each other. The branch of each first conductive trace is extended from one side of the trunk toward the adjacent first conductive trace. The branches between the two adjacent first conductive traces are disposed to be opposite and alternative. A path is composed of the two adjacent trunks and the branches disposed to be opposite and alternative. The second conductive trace is formed on the substrate, disposed between the two adjacent first conductive traces and extended along the path.

To sum up, the touch sensing structure provided by the exemplary embodiment of the present disclosure can increase mutual capacitance of the sensor circuit composed of the first conductive traces and the second conductive trace.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

An Exemplary Embodiment of a Touch Sensing Structure

Figure 1A:
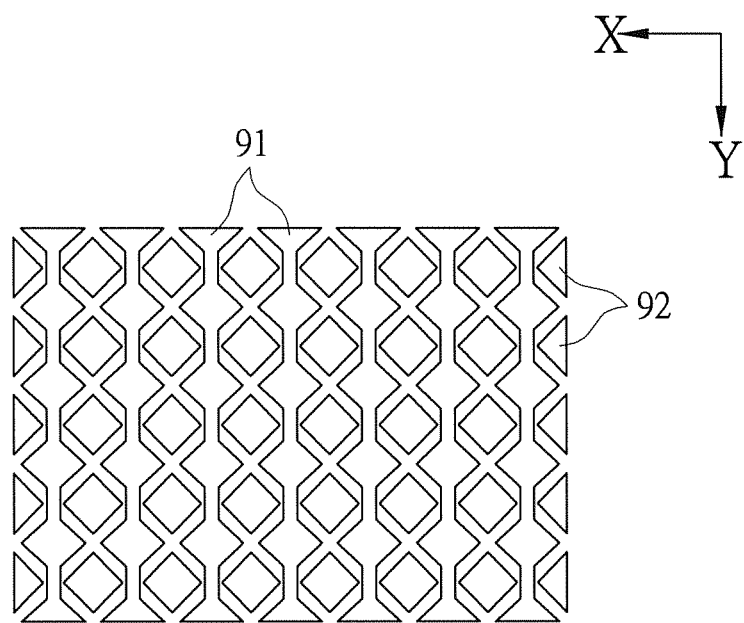
FIG. 1A is a schematic view of a conventional touch sensing structure.
Figure 1B:
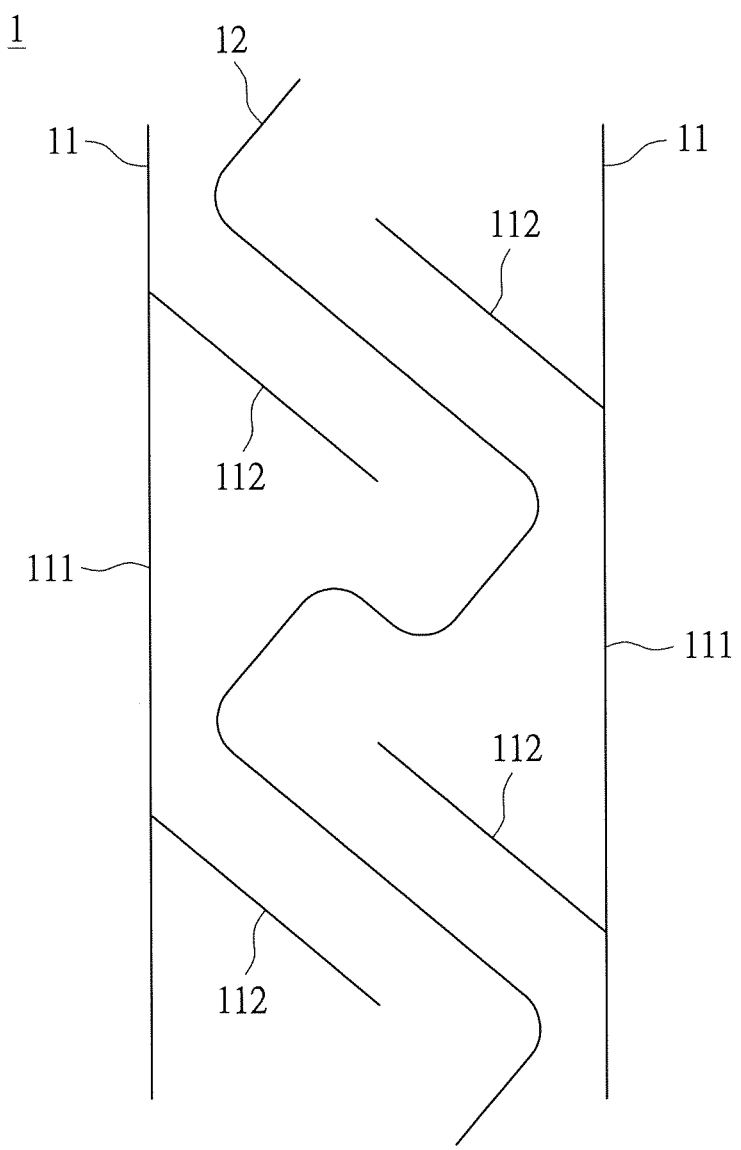
FIG. 1B is a schematic view of a touch sensing structure in an embodiment of the present disclosure.

Referring to FIG. 1B, FIG. 1B is a schematic view of a touch sensing structure in an embodiment of the present disclosure. The touch sensing structure 1 comprises a substrate (not shown in FIG. 1B), a plurality of first conductive traces 11 and a second conductive trace 12. The touch sensing structure 1 is a touch sensing unit of a capacitive touch panel. The substrate is, for example, a glass substrate. The first conductive traces 11 and the second conductive trace 12 are, for example, Indium Tin Oxide (ITO). However, the implementations are not intended to limit the scope of the present disclosure as long as the substrate can bear the conductive first conductive traces 11 and second conductive trace 12.

The plurality of first conductive traces 11 is formed on the substrate. The first conductive trace 11 comprises a trunk 111 and at least one branch 112. Referring to FIG. 1B as an example, each of the first conductive traces 11 comprises two branches 112. Nevertheless, the number of the branches 112 of the first conductive trace 11 is not intended to limit the scope of the present disclosure. The trunks 111 of the first conductive traces 11 are disposed to be parallel with each other. The branch 112 of the first conductive trace 11 is extended from one side of the trunk 111 toward the adjacent first conductive trace 11. The branches 112 between the two adjacent first conductive traces 11 are disposed to be opposite and alternative. A path is composed of the two adjacent trunks 111 and the branches 112 disposed to be opposite and alternative. The path is S-shape meander. The second conductive trace 12 is formed on the substrate. The first conductive trace 11 and the second conductive trace 12 may be formed on the same plane of the substrate or formed on the two opposite planes of the substrate respectively. The second conductive trace 12 is disposed between the two adjacent first conductive traces 11 and extended along the path. One of the first conductive trace 11 and the second conductive trace 12 is a driving trace and the other is a sensing trace. For example, when the first conductive trace 11 is a driving trace, the second conductive trace 12 is a sensing trace. When the first conductive trace 11 is a sensing trace, the second conductive trace 12 is a driving trace.

Referring to FIG. 1B as an example for illustration, the two branches 112 of the first conductive trace 11 located at left side and the two branches 112 of the first conductive trace 11 located at right side are disposed to be opposite and alternative. In the present exemplary embodiment, the angle between the branch 112 and the trunk 111 of the first conductive trace 11 is an acute angle or an obtuse angle. It should be mentioned that, the angle between the branch 112 and the trunk 111 is not intend to limit the scope of the present disclosure. The angle can be an acute angle, a right angle or an obtuse angle. In addition, the extended way of the branch 112 of the first conductive trace 11 from the trunk 111 may be implemented in different kinds which will be further illustrated in the following embodiments. By the way, the descriptions about the substrate will be omitted in the following embodiments. The implementations for the substrate of capacitive touch panel are well known to those skilled in the art, and thus will not be further described herein.

Another Exemplary Embodiment of a Touch Sensing Structure

Figure 2A:
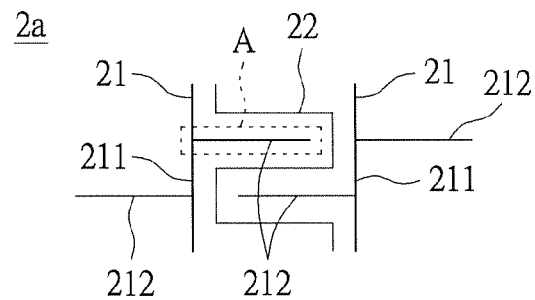
FIG. 2A is a schematic view of a touch sensing structure in another embodiment of the present disclosure.
Figure 2B:
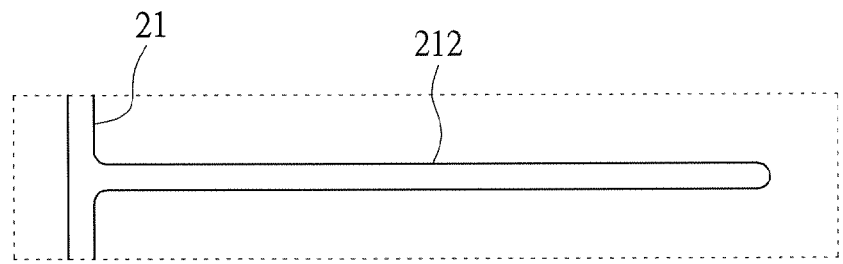
FIG. 2B is a partial enlarged view of the first conductive trace in FIG. 2A.
Figure 2C:
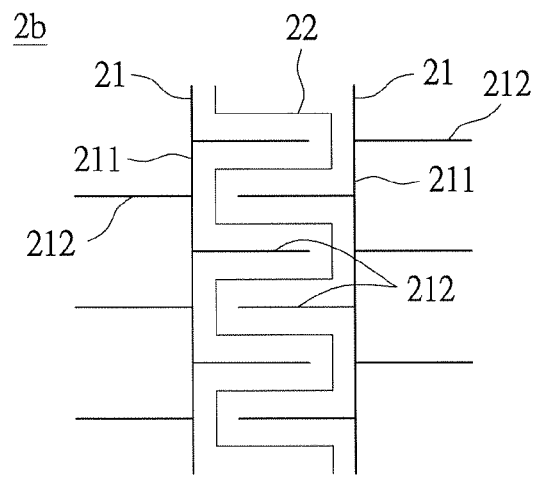
FIG. 2C is a schematic view of a touch sensing structure in another embodiment of the present disclosure.
Figure 2D:
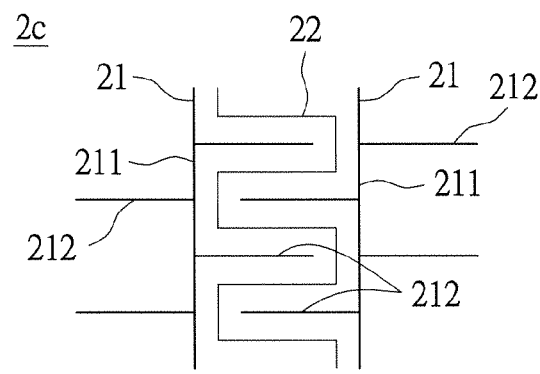
FIG. 2D is a schematic view of a touch sensing structure in another embodiment of the present disclosure.

Referring to FIG. 2A, FIG. 2B, FIG. 2C and FIG. 2D in the meanwhile, FIG. 2A, FIG. 2C and FIG. 2D are schematic views of touch sensing structures in another embodiment of the present disclosure. FIG. 2B is a partial enlarged view of the first conductive trace in FIG. 2A. Touch sensing structures 2a, 2b and 2c comprise a substrate (not shown in the figures), a plurality of first conductive traces 21 and a second conductive trace 22 respectively. The first conductive trace 21 comprises a trunk 211 and at least one branch 212. The trunks 211 of the first conductive traces 21 are disposed to be parallel with each other. As illustrated in FIG. 2A, each of the first conductive traces 21 comprises one trunk 211 and two branches 212. The branch 212 can be a left branch or a right branch. The left branch is extended from a left side of the trunk 211 toward the adjacent first conductive trace 21. The right branch is extended from a right side of the trunk 211 toward the adjacent first conductive trace 21. Furthermore, the connecting portion between the trunk 211 and the branch 212 of the first conductive trace 21 can be an arc, and the end of the branch 212 can be an arc as well, as illustrated in FIG. 2B.

As illustrated in FIG. 2C, each of the first conductive trace 21 comprises one truck 211 and six branches 212. The six branches 212 are three left branches and three right branches respectively. As illustrated in FIG. 2D, each of the first conductive trace 21 comprises one truck 211 and four branches 212. The four branches 212 are two left branches and two right branches respectively. In the present exemplary embodiment, the angle between the left branches 212 and the trunk 211 and the angle between the right branches 212 and the trunk 211 are right angles. It should be mentioned that, in FIG. 2A, FIG. 2C and FIG. 2D, the left branches 212 and the right branches 212 of the same first conductive trace 21 are disposed to be parallel and alternative with each other.

Moreover, the branches 212 between any two adjacent first conductive traces 21 are disposed to be opposite and alternative. A path is composed of the two adjacent trunks 211 and the branches 212 disposed to be opposite and alternative. The path is S-shape meander. The second conductive trace 22 is disposed between the two adjacent first conductive traces 21 and extended along the path. A tree-like structure composed of the second conductive trace 22 and the first conductive traces 21 located at both sides thereof can equally mutual sense so that sensing capacitance of the sensor circuit can be increased. The second conductive trace 22 comprises a plurality of bending portions to constitute a meander form. The bending portion can be an acute-angled bend, a right-angled bend, an obtuse-angled bend or an arc bend. As illustrated in FIG. 1B, the bending way of the second conductive trace 12 in FIG. 1B is arc bends. As illustrated in FIG. 2A, FIG. 2C and FIG. 2D, the bending way of the second conductive trace 22 is right-angled bends (i.e., the bending portions are bended by right angle).

Figure 2E:
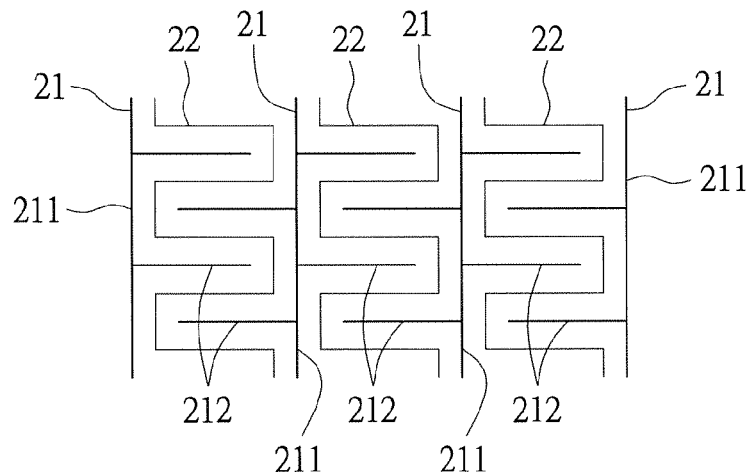
FIG. 2E is a schematic view of a touch sensing structure in another embodiment of the present disclosure.
Figures 8A, 8B:
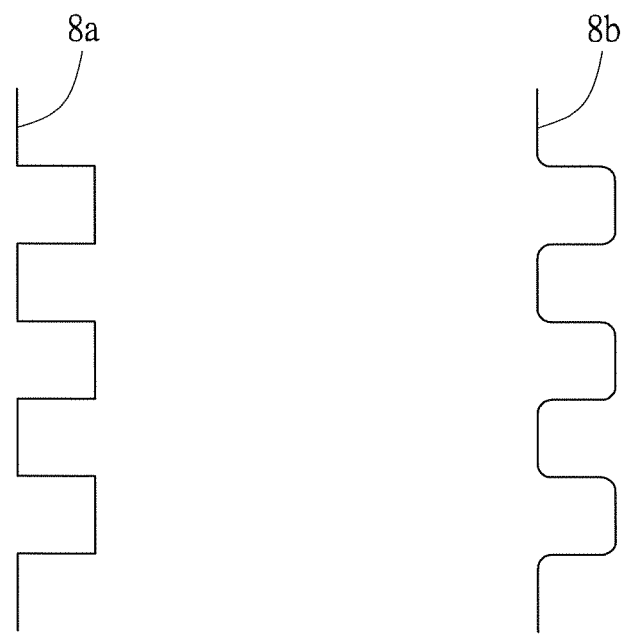
FIG. 8A and FIG. 8B are schematic views of a second conductive trace of a touch sensing structure in an embodiment of the present disclosure.

Referring to FIGS. 8A and 8B in the meanwhile, FIG. 8A and FIG. 8B are schematic views of a second conductive trace of a touch sensing structure in an embodiment of the present disclosure. As illustrated in FIG. 8A, the bending way of the second conductive trace 8a is right-angled bends (i.e., the bending portions are bended by right angle). As illustrated in FIG. 8B, the bending way of the second conductive trace 8b is arc bends. The bending ways of the second conductive trace described in the exemplary embodiment of the present disclosure are examples and contribute to illustration, without any intention to limit the scope of the present disclosure. Referring to FIG. 2E in the meanwhile, FIG. 2E is a schematic view of a touch sensing structure in another embodiment of the present disclosure. The touch sensing structure as illustrated in FIG. 2E comprises three touch sensing units disposed side by side. In other words, the three touch sensing units disposed side by side are composed of four first conductive traces 21 and three second conductive traces 22. Thus, the touch sensing structure of the present disclosure can constitute a matrix-type touch panel. The touch sensing structure further comprises bridge portions (not shown in the figures). The bridge portion is disposed to bridge on the substrate and electrically connected to the first conductive traces 21. The bridge portion is conductive and can be electrically connected to the trunks 211 or branches 212 of the first conductive traces 21.

Figure 2F:
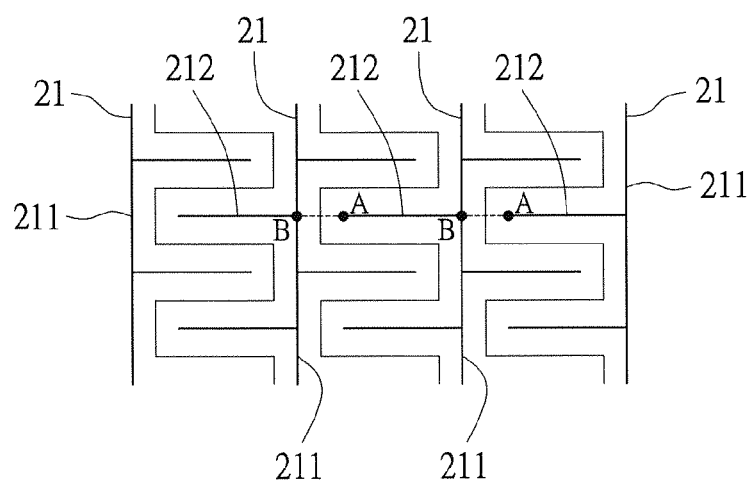
FIG. 2F is a schematic view of a touch sensing structure and a bridge portion thereof in another embodiment of the present disclosure.
Figure 2G:
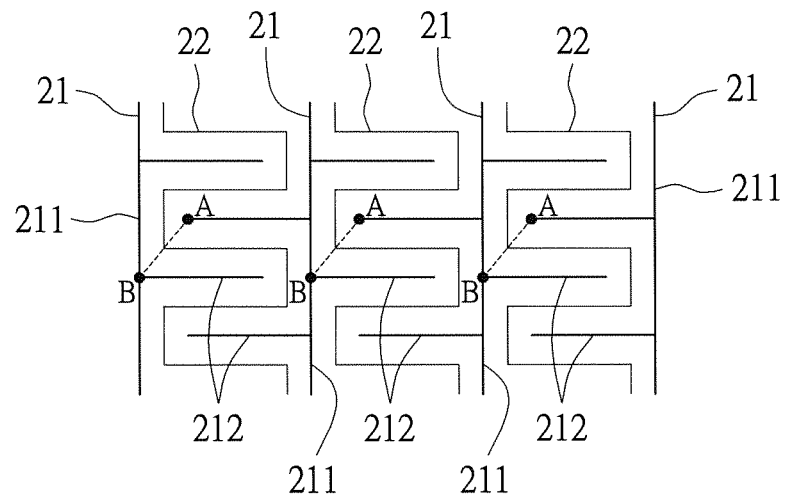
FIG. 2G is a schematic view of a touch sensing structure and a bridge portion thereof in another embodiment of the present disclosure.
Figure 2H:
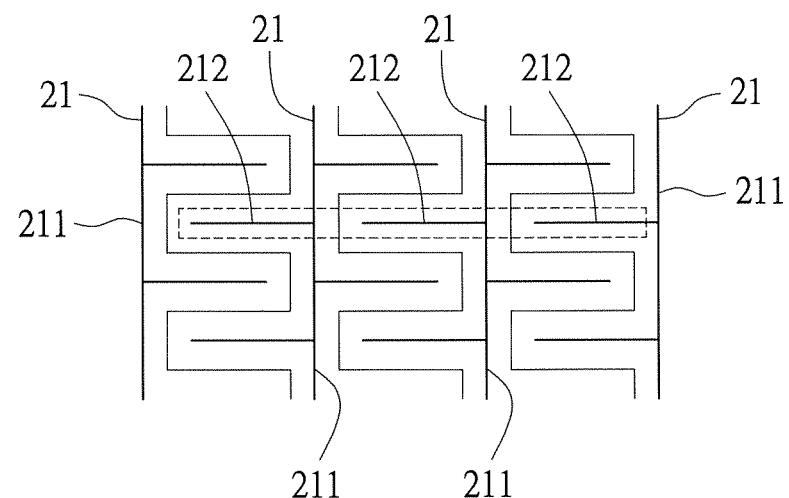
FIG. 2H is a schematic view of a touch sensing structure and a bridge portion thereof in another embodiment of the present disclosure.

Referring to FIG. 2F, FIG. 2G and FIG. 2H, FIG. 2F, FIG. 2G and FIG. 2H are schematic views of touch sensing structures and bridge portions thereof in another embodiment of the present disclosure. As illustrated in FIG. 2F and FIG. 2G, the bridge portion can be connected between the adjacent first conductive traces 21 via a bridge point A and a bridge point B on the branches 212. The bridge portion and the bridge points can be connected by via holes. The bridge points can be located at the trunk 211 or the branch 212. In particular, the bridge portion can be connected between the trunk 211 of the first conductive trace 21 and one of the left branch 212 and the right branch 212 of the branch 212. Depending on demand of practical design, the bridge portion and the first conductive traces 21 can be electrically connected by choosing appropriate bridge points. The positions of the bridge points are not intend to limit the scope of the present disclosure. In addition, the bridge portion can be connected to the adjacent first conductive traces 21 by brushing carbon film. The area in the dotted line frame as illustrated in FIG. 2H is a carbon film area. The branches 212 of the first conductive traces 21 are covered with the carbon film. At the area where the second conductive traces 22 are crossed by the bridge portion, the second conductive traces 22 can be covered with an insulating layer first to avoid conduction between the bridge portion and the second conductive traces 22.

Another Exemplary Embodiment of a Touch Sensing Structure

Figure 3:
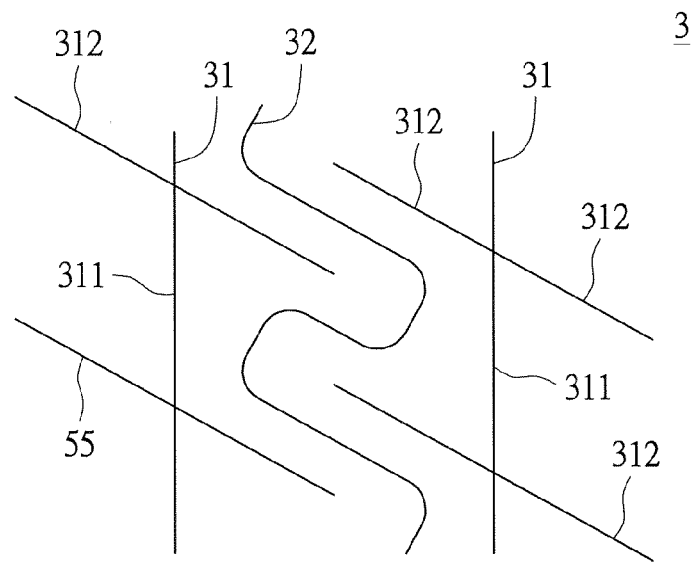
FIG. 3 is a schematic view of a touch sensing structure in another embodiment of the present disclosure.

Referring to FIG. 3, FIG. 3 is a schematic view of a touch sensing structure in another embodiment of the present disclosure. The touch sensing structure 3 comprises a substrate (not shown in FIG. 3), a plurality of first conductive traces 31 and a second conductive trace 32. The first conductive trace 31 comprises a trunk 311 and at least one branch 312. The trunks 311 of the first conductive traces 31 are disposed to be parallel with each other. As illustrated in FIG. 3, each of the first conductive traces 31 comprises one trunk 311 and four branches 312. The four branches 312 are two left branches and two right branches. The left branch is extended from a left side of the trunk 311 toward the adjacent first conductive trace 31. The right branch is extended from a right side of the trunk 311 toward the adjacent first conductive trace 31. The difference between the touch sensing structure 3 in FIG. 3 and the touch sensing structure 2a in FIG. 2A is that the left branches 312 and the right branches 312 of the same first conductive trace 31 are not disposed to be alternative with each other. In contrast, the left branch 312 and the right branch 312 of the first conductive trace 31 are extended from the same initial point on the trunk 311 toward left and right respectively in pairs so that the left branch 312 and the right branch 312 constitute a straight line. Besides, the angle between the left branch 312 and the trunk 311 and the angle between the right branch 312 and the trunk 311 are acute angles or obtuse angles. In addition, the second conductive trace 31 in FIG. 3 comprises a plurality of bending portions bended by arc to constitute a meander form. The bending portion may also be changed to an acute-angled bend, a right-angled bend or an obtuse-angled bend.

Another Exemplary Embodiment of a Touch Sensing Structure

Figure 4:
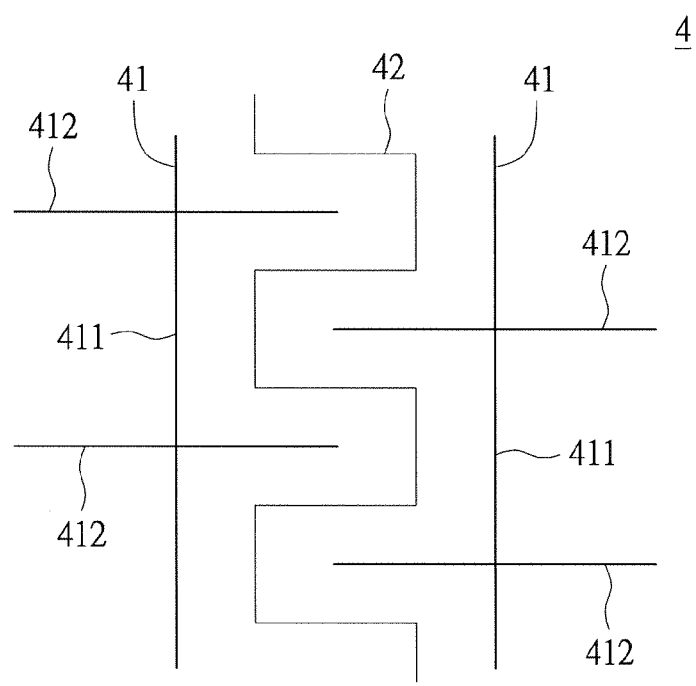
FIG. 4 is a schematic view of a touch sensing structure in another embodiment of the present disclosure.

Referring to FIG. 3 and FIG. 4 in the meanwhile, FIG. 4 is a schematic view of a touch sensing structure in another embodiment of the present disclosure. The touch sensing structure 4 comprises a substrate (not shown in FIG. 4), a plurality of first conductive traces 41 and a second conductive trace 42. The first conductive trace 41 comprises a trunk 411 and at least one branch 412. The trunks 411 of the first conductive traces 41 are disposed to be parallel with each other. The touch sensing structure 4 in FIG. 4 is approximately similar to the touch sensing structure 3 in FIG. 3. The only difference there between is that the angle between the left branch 412 and the trunk 411 and the angle between the right branch 412 and the trunk 411 are right angles. In addition, the second conductive trace 41 in FIG. 4 comprises a plurality of bending portions bended by right angle to constitute a meander form. The bending portion may also be changed to an acute-angled bend, an obtuse-angled bend or an arc bend.

Another Exemplary Embodiment of a Touch Sensing Structure

Figure 5:
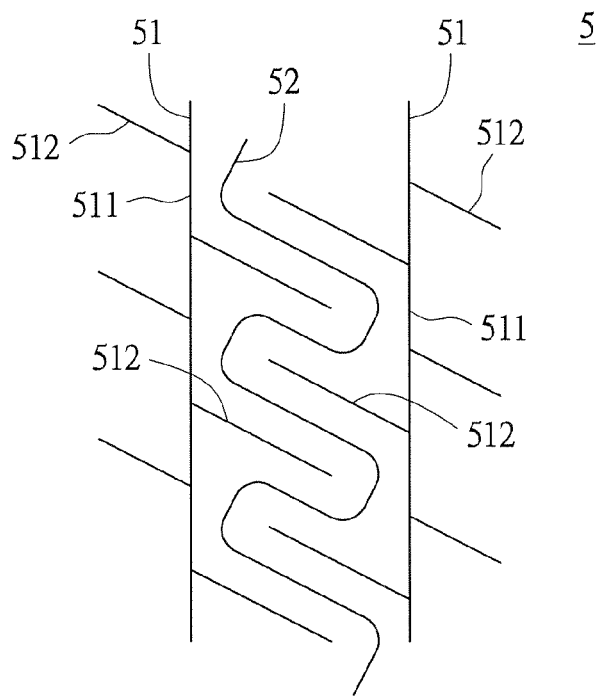
FIG. 5 is a schematic view of a touch sensing structure in another embodiment of the present disclosure.

Referring to FIG. 2B and FIG. 5 in the meanwhile, FIG. 5 is a schematic view of a touch sensing structure in another embodiment of the present disclosure. The touch sensing structure 5 comprises a substrate (not shown in FIG. 5), a plurality of first conductive traces 51 and a second conductive trace 52. Each of the first conductive trace 51 comprises a trunk 511 and at least one branch 512 (e.g., there are six branches in FIG. 5). The trunks 511 of the first conductive traces 51 are disposed to be parallel with each other. The touch sensing structure 5 in FIG. 5 is approximately similar to the touch sensing structure 2b in FIG. 2B. The only different there between is that the angle between the left branch 512 and the trunk 511 and the angle between the right branch 512 and the trunk 511 are acute angles or obtuse angles. The second conductive trace 51 comprises a plurality of bending portions bended by arc. In particular, the common part between the touch sensing structure 5 and the touch sensing structure 2b is that the left branches 212 or 512 and the right branches 212 or 512 of the same first conductive trace 21 or 51 are disposed to be alternative and parallel with each other.

Another Exemplary Embodiment of a Touch Sensing Structure

Figure 6:
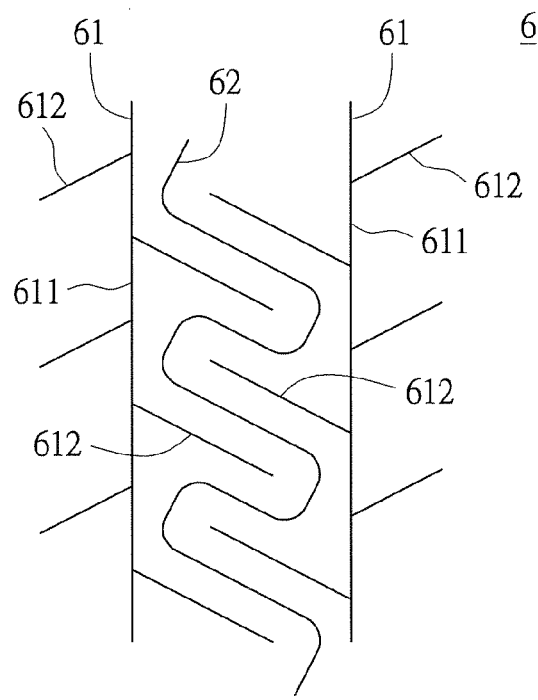
FIG. 6 is a schematic view of a touch sensing structure in another embodiment of the present disclosure.

Referring to FIG. 5 and FIG. 6 in the meanwhile, FIG. 6 is a schematic view of a touch sensing structure in another embodiment of the present disclosure. The touch sensing structure 6 comprises a substrate (not shown in FIG. 6), a plurality of first conductive traces 61 and a second conductive trace 62. Each of the first conductive trace 61 comprises a trunk 611 and at least one branch 612 (e.g., there are six branches in FIG. 6). The opposite and alternative branches 612 between the two adjacent trunks 611 are parallel with each other. In particular, the branch 612 of the first conductive trace 61 is extended from one side of the trunk 611 toward the adjacent first conductive trace 61. The branches 612 between the two adjacent first conductive traces 61 are disposed to be opposite and alternative. In addition, the left branch 612 and the right branch 612 of the same first conductive traces 61 are disposed to be non-parallel. In the condition that the touch sensing structure 6 is disposed to be a matrix-type (e.g., the matrix-type in FIG. 2E), the left branch 612 of the left first conductive traces 61 and the right branch 612 of the right first conductive traces 61 are disposed to be parallel with each other.

In other words, although the left branch 612 of the left first conductive traces 61 and the right branch 612 of the left first conductive traces 61 are not parallel with each other and the left branch 612 of the right first conductive traces 61 and the right branch 612 of the right first conductive traces 61 are not parallel with each other, the opposite and alternative branches are parallel with each other. For example, as illustrated in FIG. 6, the right branch 612 of the left first conductive traces 61 and the left branch 612 of the right first conductive traces 61 are the opposite and alternative branches and parallel with each other. The left branch 612 of the left first conductive traces 61 and the right branch 612 of another first conductive trace 61 adjacent to the left are the opposite and alternative branches and parallel with each other. The right branch 612 of the right first conductive traces 61 and the left branch 612 of another first conductive trace 61 adjacent to the right are the opposite and alternative branches and parallel with each other. In short, it only requires that the opposite branches 612 of two adjacent first conductive traces 61 are disposed to be alternative and parallel with each other, as illustrated by the touch sensing structure 1 in FIG. 1B. When the same first conductive traces 61 comprises both a left branch 612 and a right branch 612, the left branch 612 and the right branch 612 of the same first conductive traces 61 can be non-parallel with each other.

Another Exemplary Embodiment of a Touch Sensing Structure

Figure 7:
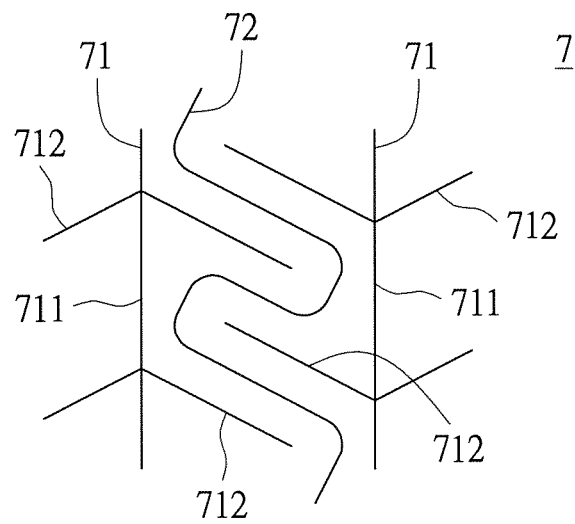
FIG. 7 is a schematic view of a touch sensing structure in another embodiment of the present disclosure.

Referring to FIG. 6 and FIG. 7 in the meanwhile, FIG. 7 is a schematic view of a touch sensing structure in another embodiment of the present disclosure. The touch sensing structure 7 comprises a substrate (not shown in FIG. 7), a plurality of first conductive traces 71 and a second conductive trace 72. Each of the first conductive trace 71 comprises a trunk 711 and at least one branch 712 (e.g., there are four branches in FIG. 7). The opposite and alternative branches 712 between the two adjacent trunks 711 are parallel with each other. The touch sensing structure 7 is approximately similar to the touch sensing structure 6 in FIG. 6. The only difference there between is that the left branch 712 and the right branch 712 of the same first conductive trace 71 are not disposed to be alternative with each other. In contrast, the left branch 712 and the right branch 712 of the first conductive trace 71 are extended from the same initial point on the trunk 711 toward left and right respectively in pairs. The other parts of the touch sensing structure 7 can refer to the previous exemplary embodiment, and thus will not be further described herein.

According to the exemplary embodiments of the present disclosure, a path is composed of two adjacent trunks and branches disposed to be opposite and alternative in the above mentioned touch sensing structures. The path is S-shape meander. A second conductive trace is disposed between two adjacent first conductive traces and extended along the path. Thus, mutual capacitance of the sensor circuit composed of the first conductive traces and the second conductive trace is increased.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A touch sensing structure, comprising:
    a substrate;
    a plurality of first conductive traces electrically connected together, formed on the substrate, wherein each of the first conductive traces comprises a trunk and at least one branch, the trunks of the first conductive traces are disposed to be parallel with each other, the branch of each first conductive trace is extended from one side of the trunk toward the adjacent first conductive trace, the branches between the two adjacent first conductive traces are disposed to be opposite and alternative, and a path is composed of the two adjacent trunks and the branches disposed to be opposite and alternative; and
    a plurality of second conductive traces, formed on the substrate, each second conductive trace disposed between the two adjacent first conductive traces electrically connected and extended along the path;
    wherein the two adjacent first conductive traces are electrically connected together via a bridge portion, the bridge portion crosses by the second conductive traces, and the bridge portion is insulated with the second conductive traces;
    wherein the path is an S-shape meander extended path located between the two adjacent first conductive traces electrically connected together, each second conductive trace comprises a plurality of bending portions to match the path, and the second conductive traces are not overlap with the first conductive traces;
    wherein one of the first conductive trace and the second conductive trace is a driving trace, and the other one of the first conductive trace and the second conductive trace is a sensing trace.

2. The touch sensing structure as claimed in claim 1, wherein the at least one branch of the first conductive trace comprises a left branch and a right branch, the left branch is extended from a left side of the trunk toward the adjacent first conductive trace, and the right branch is extended from a right side of the trunk toward the adjacent first conductive trace.

3. The touch sensing structure as claimed in claim 1, wherein the branches between the two adjacent trunks are disposed to be parallel with each other.

4. The touch sensing structure as claimed in claim 2, further comprising a bridge portion, disposed to bridge on the substrate and electrically connected to the two adjacent first conductive traces respectively.

5. The touch sensing structure as claimed in claim 3, further comprising a bridge portion, disposed to bridge on the substrate and electrically connected to the two adjacent first conductive traces respectively.

6. The touch sensing structure as claimed in claim 1, wherein the bridge portion is connected to the trunks or the branches of the first conductive traces respectively.

7. The touch sensing structure as claimed in claim 4, wherein the bridge portion is connected to the trunks or the branches of the first conductive traces respectively.

8. The touch sensing structure as claimed in claim 5, wherein the bridge portion is connected to the trunks or the branches of the first conductive traces respectively.

9. The touch sensing structure as claimed in claim 2, wherein the left branch and the right branch of the same first conductive trace are disposed to be alternative.

10. The touch sensing structure as claimed in claim 2, wherein the left branch and the right branch of the first conductive trace are extended from the same initial point on the trunk toward left and right respectively in pairs.

11. The touch sensing structure as claimed in claim 2, wherein the left branch and the right branch of the same first conductive trace are disposed to be parallel with each other.

12. The touch sensing structure as claimed in claim 2, wherein the left branch and the right branch of the same first conductive trace are disposed to be non-parallel.

13. The touch sensing structure as claimed in claim 1, wherein an angle between the branch and the trunk of the first conductive trace is an acute angle, a right angle or an obtuse angle.

14. The touch sensing structure as claimed in claim 2, wherein an angle between the left branch and the trunk and an angle between the right branch and the trunk of the first conductive trace are acute angles, right angles or obtuse angles.

15. The touch sensing structure as claimed in claim 1, wherein the first conductive trace is a driving trace and the second conductive trace is a sensing trace.

16. The touch sensing structure as claimed in claim 1, wherein the first conductive trace is a sensing trace and the second conductive trace is a driving trace.

17. The touch sensing structure as claimed in claim 1, wherein the bending portion is an acute-angled bend, a right-angled bend, an obtuse-angled bend or an arc bend.

* * * * *